United States Patent
Kerdreux et al.

(10) Patent No.: US 9,415,867 B2
(45) Date of Patent: Aug. 16, 2016

(54) CONTROL MEMBER PROVIDED WITH A BLADE COLLECTIVE PITCH LEVER AND YAW CONTROL MEANS, AND AN AIRCRAFT

(71) Applicant: AIRBUS HELICOPTERS, Marignane (FR)

(72) Inventors: Christelle Kerdreux, Velaux (FR); Marc Colaprisco, Gignac la Nerthe (FR); David Bardet, Salon de Provence (FR)

(73) Assignee: Airbus Helicopters, Marignane (FR)

( * ) Notice: Subject to any disclaimer, the term of this patent is extended or adjusted under 35 U.S.C. 154(b) by 298 days.

(21) Appl. No.: 14/165,712

(22) Filed: Jan. 28, 2014

(65) Prior Publication Data

US 2014/0263850 A1   Sep. 18, 2014

(30) Foreign Application Priority Data

Jan. 29, 2013  (FR) ..................... 13 00186

(51) Int. Cl.
  *B64C 27/56* (2006.01)
  *G05G 9/047* (2006.01)
(52) U.S. Cl.
  CPC ................ *B64C 27/56* (2013.01); *G05G 9/047* (2013.01)
(58) Field of Classification Search
  CPC ........ B64C 27/56; B64C 27/58; B64C 27/80; B64C 13/04; Y10T 4/20612; Y10T 74/20207; Y10T 74/20213

USPC ........ 244/17.11, 17.23, 17.25, 220, 229, 237, 244/99.2, 234; 74/471 R, 471 XY, 496, 523
See application file for complete search history.

(56) References Cited

U.S. PATENT DOCUMENTS

| 4,819,896 A | 4/1989 | Narad |
| 5,395,077 A | 3/1995 | Wolford |
| 5,503,040 A * | 4/1996 | Wright .................... B64C 13/04 244/236 |
| 2004/0130529 A1 | 7/2004 | Magara |
| 2012/0255386 A1* | 10/2012 | Couderc ................. B64C 13/30 74/471 XY |

FOREIGN PATENT DOCUMENTS

| FR | 2479133 A1 | 10/1981 |
| JP | 2009073355 | 4/2009 |

OTHER PUBLICATIONS

Preliminary Search Report and Written Opinion; Application No. FR 1300186; dated Sep. 17, 2013.

* cited by examiner

*Primary Examiner* — Benjamin P Lee
(74) *Attorney, Agent, or Firm* — Brooks Kushman P.C.

(57) ABSTRACT

A control member (10) having a collective pitch lever (20) extending from a first end (21) to a second end (22). Said control member (10) has a handle (30) for controlling a yaw movement control device, said handle (30) being secured to an inner ring (40) that is guided to pivot about a second axis (AXLAC) by an outer ring (50) secured to said second end (22), said inner ring (40) being constrained to move together with said outer ring (50) and the lever (20) in pivoting about said first axis (AXCOL).

10 Claims, 1 Drawing Sheet

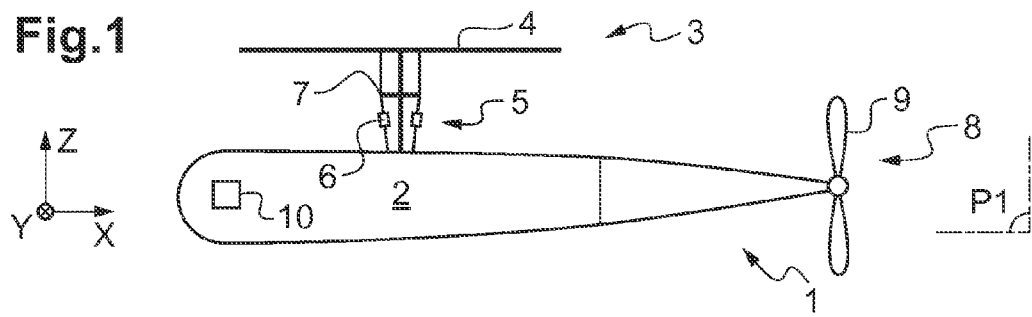
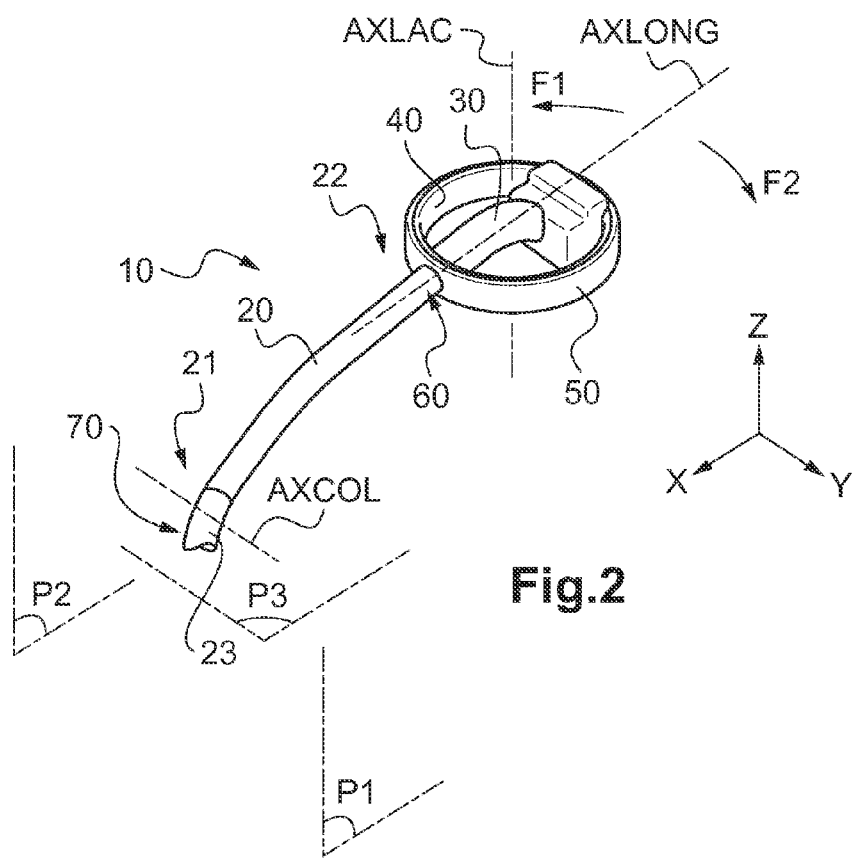
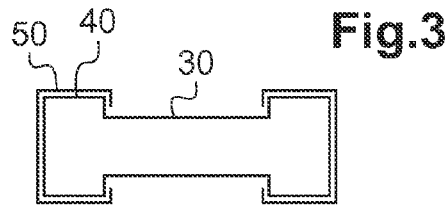
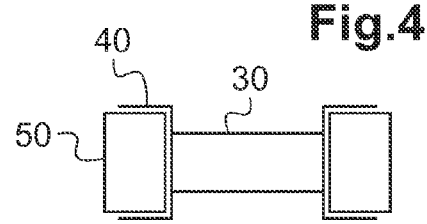
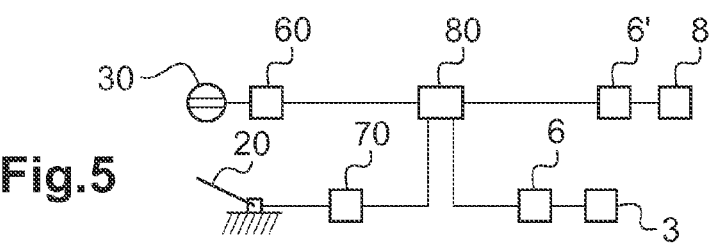

CONTROL MEMBER PROVIDED WITH A BLADE COLLECTIVE PITCH LEVER AND YAW CONTROL MEANS, AND AN AIRCRAFT

CROSS REFERENCE TO RELATED APPLICATION

This application claims priority to French patent application No. FR 13 00186 filed on Jan. 29, 2013, the disclosure of which is incorporated in its entirety by reference herein.

BACKGROUND OF THE INVENTION (1) Field of the Invention

The present invention relates to a control member provided firstly with a lever for controlling the collective pitch of blades of a rotorcraft lift rotor, and secondly with yaw control means for controlling the yaw movement of the aircraft. The invention also provides an aircraft provided with such a control member.

The invention lies in the field of rotorcraft, and more particularly in the field of control means for directional piloting of the rotorcraft in yaw.

(2) Description of Related Art

A rotorcraft has a rotary wing. The rotary wing has at least one lift rotor with a plurality of blades. The lift rotor thus participates in providing the aircraft with lift, and possibly also with propulsion if the rotorcraft is a helicopter, for example.

Furthermore, the rotorcraft may include a device for controlling the yaw movement of the rotorcraft. Depending on the rotorcraft, the yaw movement control device may be implemented by means of an additional rotor, by means of at least one propulsive propeller, or indeed by means of a device for ejecting fluid, for example.

Under such circumstances, the rotorcraft has a plurality of control means that can be operated by a pilot in order to pilot the rotorcraft. The pilot then moves the control means in order to generate control orders. These control orders thus give rise to a maneuver or the rotary wing and/or of the yaw movement control device.

The control orders may be transmitted mechanically or electrically, in particular to servo-controls in order to modify the pitch of blades in a rotating assembly.

In order to control a lift rotor, the control means may for example be connected to servo-controls that move a set of plates known as "swashplates". These plates then comprise a non-rotary plate connected to the servo-controls and a rotary plate connected to each of the blades of a lift rotor.

The rotorcraft can then have a collective pitch control member acting on the collective pitch of the blades of the rotary wing, and a cyclic control member acting on the cyclic pitch of the blades of that rotary wing.

The collective pitch control member usually comprises a lever suitable for performing pivoting movement in a substantially vertical plane. The collective pitch control member is thus known as the "collective pitch lever".

The cyclic pitch control member usually comprises a stick suitable for performing turning movement about two axes. The cyclic pitch control member is thus sometimes referred to as a "cyclic stick".

In addition, a rotorcraft may include a yaw control member of the pedals type for controlling the rotorcraft in yaw via the yaw movement control device. For example, the pedals may control the collective pitch of blades of an additional rotor.

Such pedals are advantageous, but they present the drawback of obstructing a pilot's field of view when looking downwards and forwards.

In addition, the pedals may give to ergonomic problems associated with the size of a pilot.

Likewise, the pedals may give to ergonomic problems associated with a limiting height of a control panel above the pedals. A pilot's knees run the risk of hitting such control panel when the pilot seeks to move the pedals with the feet.

Finally, the use of pedals can require the pilot to make an intellectual effort in order to avoid issuing a yaw control going in the direction opposite to the desired direction.

In the state of the art, document FR 2 479 133 proposes a control system having four piloting axes for controlling collective pitch, cyclic pitch about a longitudinal axis, cyclic pitch about a transverse axis, and yaw movement.

Document U.S. Pat. No. 5,395,077 proposes replacing pedals with a control joystick. The joystick has its base fastened to a hinge with two perpendicular axes. The joystick can then perform pivoting movement in a vertical plane about a first axis in order to transmit a collective pitch control order, and in a horizontal plane about the second axis in order to transmit a yaw movement control order.

Document U.S. Pat. No. 4,819,896 suggests arranging a turnable handle on a cyclic control stick.

Document US 2004/0130529 describes a device having a lever that extends in elevation from a support towards a handle.

Also known is document JP 2009 073355.

BRIEF SUMMARY OF THE INVENTION

An object of the present invention is thus to propose a novel collective pitch control member for eliminating rotorcraft pedals.

According to the invention, a control member is provided with a collective pitch lever for controlling a collective pitch of a plurality of blades of at least one lift rotor of a rotary wing of a rotorcraft. The collective pitch lever then extends from a first end towards a second end, the control member having a hinge hinged to the first end to enable the lever to pivot in a vertical plane about a first axis in order to generate a control order for controlling the collective pitch of said blades.

The control member is also for use in a rotorcraft having a yaw movement control device. Such a yaw movement control device may include an additional rotor such as a tail rotor or a second lift rotor, at least one propeller, at least one flap, or indeed a device for ejecting fluid, without that going beyond the ambit of the invention. The invention is thus applicable to any rotorcraft having at least one lift rotor and a device for controlling its movement in yaw.

In remarkable manner, the control member includes a handle for controlling the yaw movement control device. The handle is secured to an inner ring guided to turn about a second axis by an outer ring secured to the second end so that a pilot turning a hand holding the handle causes the handle to turn relative to the outer ring in order to generate an order for controlling yaw movement. The inner ring is constrained to move together with the outer ring and the lever in pivoting about the first axis so that a movement in elevation of the hand causes the lever to pivot about the first axis in order to generate an order for controlling the collective pitch.

Consequently, the control member makes it possible to generate a collective pitch control order and a yaw movement control order. The invention thus makes it possible to eliminate the usual pedals.

Furthermore, the movement performed by a pilot for controlling the yaw movement of the aircraft is very intuitive. Turning in the counterclockwise direction causes the rotorcraft to move in the counterclockwise direction, and vice versa.

The control member may also include one or more of the following additional characteristics.

In particular, the inner ring and the outer ring optionally have a common axis of revolution, the axis of revolution coinciding with the second axis.

Consequently, a pilot can use the handle to generate a yaw movement order without making a forearm movement. This makes the work of the pilot easier.

Furthermore, the handle may be mounted to pivot on the collective pitch lever about a second axis perpendicular to a longitudinal axis in which the lever extends.

This makes the control member more ergonomic, since the second axis of the control member lies substantially in alignment with the pilot's forearm.

This second axis may in particular be parallel to a sagittal plane of the helicopter so that the turning movement made by the pilot is representative of the yaw movement that is generated.

Furthermore, the inner ring may be inscribed at least in part in the outer ring.

For example, the rim of the outer ring encloses the inner ring in order to constrain the outer and inner rings to move together in pivoting about the first axis.

In another variant, the outer ring is inscribed at least in part in the inner ring.

Furthermore, the control member may include measurement means for measuring the angular position of the inner ring relative to a yaw reference.

By way of example, the measurement means include a sensor known as a rotary variable differential transformer (RVDT). The RVDT sensor is optionally arranged in the lever.

The yaw reference is optionally a reference point on the outer ring, or on the lever, or else it is an extension longitudinal axis of the lever.

The control member may also include a measurement system for measuring the angular position of the lever relative to a collective pitch reference.

By way of example, this measurement system comprises an RVDT sensor.

The control member can thus generate measurement signals as a result of turning of the handle and/or pivoting of the lever.

For a control member comprising measurement means for measuring the angular position of the inner ring relative to a yaw reference and a measurement system for measuring the angular position of the lever relative to a collective pitch reference, the control member is advantageously provided with a processor unit connected to the measurement means and to the measurement system in order to generate an order for controlling the yaw movement as a function of the angular position of the handle and an order for controlling the collective pitch as a function of the angular position of the lever.

The measurement signals are thus transmitted to the processor unit. The processor unit processes the measurement signals in order to generate signals for controlling collective pitch and/or yaw. The control signals are then transmitted to at least one lift rotor and/or to a yaw movement control device. More particularly, the control signals may be transmitted to servo-controls suitable for modifying the pitch of the blades of at least one lift rotor and/or of a yaw movement control device.

A yaw movement control signal may relate equally well to information concerning an angular velocity in yaw or information relating to a side loading factor, or information relating to turning relative to the ground.

The control member may also include an electric motor delivering a return force.

In addition to a control member, the invention also provides a rotorcraft having at least one lift rotor of a rotary wing provided with a plurality of blades and a yaw movement control device.

The rotorcraft is provided with a control member as described above for controlling the collective pitch of the blades and for controlling the yaw movement control device.

The control member may include a handle secured to an inner ring guided to pivot about a second axis by an outer ring, and the second axis about which said handle is pivotally guided in the outer ring is firstly situated in line with a pilot's forearm, and secondly is parallel to a sagittal plane of the rotorcraft.

BRIEF DESCRIPTION OF THE SEVERAL VIEWS OF THE DRAWINGS

The invention and its advantages appear in greater detail from the context of the following description of embodiments given by way of illustration and with reference to the accompanying figures, in which:

FIG. 1 is a diagram showing a rotorcraft including a control member of the invention;

FIG. 2 is a diagram showing a handle of a control member of the invention;

FIG. 3 is a diagram showing an inner ring enclosed in an outer ring;

FIG. 4 is a diagram showing an inner ring and enclosing an outer ring; and

FIG. 5 is a diagram showing a control member of the invention.

Elements present in more than one of the figures are given the same references in each of them.

It should be observed that three mutually orthogonal directions X, Y, and Z are shown in certain figures.

DETAILED DESCRIPTION OF THE INVENTION

The first direction X is said to be longitudinal. The term "longitudinal" relates to any direction parallel to the first direction X.

The second direction Y is said to be transverse. The term "transverse" relates to any direction parallel to the second direction Y.

Finally, the third direction Z is said to be in elevation. The term "in elevation" relates to any direction parallel to the third direction Z.

FIG. 1 shows a rotorcraft 1. The rotorcraft comprises a fuselage 2 extending longitudinally along a sagittal plane P1 from a nose to a tail portion, transversely from a left side to a right side, and in elevation from a bottom portion to a top portion.

The top portion of the fuselage 2 carries a rotary wing, the rotary wing having at least one lift rotor 3.

The blades 4 of the lift rotor are controllable in pitch both collectively and cyclically, by means of a set of swashplates 7 that are moved by a mover system 5. The mover system may have one or more servo-controls 6.

In addition, the fuselage 2 has a yaw movement control device 8. In the example shown, this yaw movement control device 8 is a tail rotor having a plurality of blades 9.

Such a rotorcraft is provided with a control member 10 for controlling the collective pitch of the blades of the lift rotor 3, and the yaw movement control device 8.

FIG. 2 shows the control member 10.

The control member has a lever 20 that extends from a first end towards a second end along a longitudinal axis AXLONG.

The first end 21 is then hinged to a floor P3 by a hinge 23. The lever 20 can then pivot in a vertical plane P2 about an axis referred to for convenience as the "first axis AXCOL". This vertical plane P2 may for example be parallel to the sagittal plane P1 of the rotorcraft 1.

The control member also has means for transmitting movement so that pivoting the lever gives rise to a modification in the collective pitch of the blades of the lift rotor.

For example, these movement transmission means comprise a measurement system for measuring the angular position of the lever 20 relative to a collective pitch reference. The measurement system may comprise an RVDT sensor.

In alternative manner, the lever may co-operate with a mechanical linkage for transmitting movement.

The lever thus constitutes means for controlling the blade collective pitch.

In addition to means for controlling the blade collective pitch, the control member 10 has a handle 30 for controlling the yaw movement control device 8. For example, the handle enables the collective pitch of the blades 9 of a rotor of the yaw movement control device 8 to be controlled.

The handle 30 may comprise a plurality of movable members, such as the members present on a collective pitch lever in the prior art.

The handle 30 is secured to an inner ring 40 by being inscribed within this inner ring. Consequently, the handle 30 may extend along a diameter of the inner ring 40.

Under such circumstances, the control member 10 has an outer ring 50 secured to the second end 22. The outer end 50 then surrounds the inner ring 40 in order to guide it in turning about a second axis AXLAC.

This second axis AXLAC may coincide with the axes of symmetry of the inner and outer rings 40 and 50, being parallel to the sagittal plane P1 of the rotorcraft, and substantially perpendicular to the longitudinal axis AXLONG.

The handle can then pivot about the second axis AXLAC relative to the outer ring 50 and thus to the lever 20 in order to control the yaw movement of the aircraft.

Under such circumstances, the control member has movement transmission means so that turning the handle 30 about the second axis as shown by arrows F1 and F2 gives rise to a modification to the yaw movement of the rotorcraft. For example, these movement transmission means comprise measurement means for measuring the angular position of the handle 30 relative to a yaw reference. The measurement means may comprise an RVDT sensor or a mechanical linkage for transmitting movement.

The inner ring 40 can thus perform turning movement about the second axis relative to the outer ring 50. In contrast, the inner ring 40 and the outer ring 50 co-operate with each other so that the handle moves as a whole when the lever 20 pivots about the first axis AXCOL.

In the embodiment of FIG. 3, the inner ring 40 is inscribed at least in part in the outer ring 50.

In the alternative embodiment of FIG. 4, the outer ring 50 is inscribed at least in part in the inner ring 40.

Consequently, in order to control the collective pitch of the blades of the lift rotor and the yaw movement of the rotorcraft, a pilot takes hold of the handle 30.

By performing a turning movement with the hand, the pilot controls the yaw movement of the rotorcraft. In contrast, by pulling or pushing the handle, the pilot moves the lever 20 and controls the collective pitch of the blades of the lift rotor.

With reference to FIG. 5, the control member 10 may include a processor unit 80 suitable for generating control signals for controlling the collective pitch and yaw as a function of the positions of the handle 30 and of the lever 20.

FIG. 5 is diagrammatic for explanatory purposes. The lever 20 and the handle 30 are normally connected to each other via the inner and outer rings.

Under such circumstances, measurement means 60 can send a measurement signal to the processor unit 80, the measurement signal depending on the angular position of the handle in the outer ring. The processor unit deduces therefrom a control signal that is transmitted to the yaw movement control device 8. For example, the control signal is transmitted to at least one electric servo-control 6'.

Likewise, a measurement system 70 may send a measurement signal to the processor unit 80, the measurement signal depending on the angular position of the lever relative to the floor P3. The processor unit deduces therefrom a control signal that is transmitted to the lift rotor. For example, the control signal is transmitted to at least one electric servo-control 6'.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A control member provided with a collective pitch lever for controlling a collective pitch of a plurality of blades of at least one lift rotor of a rotorcraft, the rotorcraft having a yaw movement control device, the collective pitch lever extending from a first end towards a second end, the control member having a hinge hinged to the first end to enable the lever to pivot in a vertical plane (P2) about a first axis (AXCOL) in order to generate an order for controlling the collective pitch of the blades, wherein the control member includes a handle for controlling the yaw movement control device, the handle being secured to an inner ring guided to turn about a second axis (AXLAC) by an outer ring secured to the second end so that a pilot turning a hand holding the handle causes the handle to turn relative to the outer ring in order to generate an order for controlling yaw movement, the inner ring being constrained to move together with the outer ring and the lever in pivoting about the first axis (AXCOL) so that a movement in elevation of the hand causes the lever to pivot about the first axis (AXCOL) in order to generate an order for controlling the collective pitch.

2. A member according to claim 1, wherein the inner ring and the outer ring have a common axis of symmetry, the axis of symmetry coinciding with the second axis (AXLAC).

3. A member according to claim 1, wherein the handle is mounted to pivot on the collective pitch lever about a second axis (AXLAC) perpendicular to a longitudinal axis (AXLONG) in which the lever extends.

4. A member according to claim 1, wherein the inner ring is inscribed at least in part in the outer ring.

5. A member according to claim 1, wherein the outer ring is inscribed at least in part in the inner ring.

6. A member according to claim 1, wherein the control member includes measurement means for measuring an angular position of the inner ring relative to a yaw reference.

7. A member according to claim 1, wherein the control member includes a measurement system for measuring an angular position of the lever relative to a collective pitch reference.

8. A member according to claim 1, wherein the control member includes measurement means for measuring an angular position of the inner ring relative to a yaw reference and a measurement system for measuring am angular position of the lever relative to a collective pitch reference, and the control member includes a processor unit connected to the measurement means and to the measurement system to generate a control order for controlling the yaw movement of the rotorcraft as a function of an angular position of the handle and a control order for controlling the collective pitch as a function of the angular position of the lever.

9. A rotorcraft having at least one lift rotor provided with a plurality of blades and a yaw movement control device, wherein the rotorcraft is provided with a control member according to claim 1 for controlling the blades of the lift rotor in collective pitch and for controlling the yaw movement control device.

10. A rotorcraft according to claim 9, wherein the control member includes a handle secured to an inner ring guided to pivot about a second axis (AXLAC) by an outer ring, and the second axis (AXLAC) about which the handle is pivotally guided in the outer ring is firstly situated in line with a pilot's forearm, and secondly is parallel to a sagittal plane (P1) of the rotorcraft.

* * * * *